(12) United States Patent
Takeuchi (10) Patent No.: US 9,427,703 B2
(45) Date of Patent: Aug. 30, 2016

(54) CO2 SEPARATION AND RECOVERY EQUIPMENT, AND A COAL GASIFICATION COMBINED POWER PLANT COMPRISING CO2 SEPARATION AND RECOVERY EQUIPMENT

(75) Inventor: Hiroto Takeuchi, Tokai (JP)

(73) Assignee: HITACHI, LTD., Tokyo (JP)

( * ) Notice: Subject to any disclaimer, the term of this patent is extended or adjusted under 35 U.S.C. 154(b) by 655 days.

(21) Appl. No.: 13/877,412

(22) PCT Filed: Sep. 12, 2011

(86) PCT No.: PCT/JP2011/070749
§ 371 (c)(1),
(2), (4) Date: Jul. 1, 2013

(87) PCT Pub. No.: WO2012/046542
PCT Pub. Date: Apr. 12, 2012

(65) Prior Publication Data
US 2013/0283761 A1 Oct. 31, 2013

(30) Foreign Application Priority Data

Oct. 5, 2010 (JP) ................................. 2010-225474

(51) Int. Cl.
*B01D 53/62* (2006.01)
*C01B 3/16* (2006.01)
(Continued)

(52) U.S. Cl.
CPC .................. *B01D 53/62* (2013.01); *C01B 3/12* (2013.01); *C01B 3/16* (2013.01); *C01B 3/50* (2013.01);
(Continued)

(58) Field of Classification Search
CPC ............. C01B 3/12; C01B 3/16; C01B 3/50; C01B 3/52; C01B 2203/0283; C01B 2203/0415; C01B 2203/0475; C01B 2203/0485; B01D 53/62; F01K 17/04; F01K 23/067; F05D 2220/722; F05D 2260/61; F05D 2260/611; C10K 3/04; C10K 3/026; C10K 1/005; Y02E 20/185; Y02E 20/16; Y02E 20/18; F02C 3/28; Y02C 10/04; C10J 2300/093; C10J 2300/1623; C10J 2300/1612; Y02P 20/146
See application file for complete search history.

(56) References Cited

U.S. PATENT DOCUMENTS 6,211,254 B1 * 4/2001 Whitney ............. C07C 29/1518
252/373
7,736,403 B2 * 6/2010 Barnicki .................. C01B 3/34
261/128
(Continued)

FOREIGN PATENT DOCUMENTS

EP 0 444 987 A1 9/1991
EP 1 833 130 A1 1/2008
(Continued)

*Primary Examiner* — Carlos A Rivera
(74) *Attorney, Agent, or Firm* — Volpe and Koenig, P.C.

(57) ABSTRACT

Provided are $CO_2$ separation and recovery equipment that yields a higher $CO_2$ recovery rate, and a coal gasification combined power plant including the $CO_2$ separation and recovery equipment with high plant efficiency. The $CO_2$ separation and recovery equipment, has a CO shift reactor in which a gas containing as its main components of CO and $H_2O$ is introduced and converted into $CO_2$ and $H_2$, and includes: an inlet valve that is provided on the inlet side of the CO shift reactor; an outlet valve that is provided on the outlet side of the CO shift reactor; a steam control valve for applying high-temperature steam to a foregoing part of the inlet valve; and a gas composition analyzer that senses a gas composition of a stream flowing into the CO shift reactor.

7 Claims, 5 Drawing Sheets (51) Int. Cl.

| | | |
|---|---|---|
| *C01B 3/50* | (2006.01) | |
| *C01B 3/52* | (2006.01) | |
| *F01K 17/04* | (2006.01) | |
| *C10K 3/04* | (2006.01) | |
| *F01K 23/06* | (2006.01) | |
| *C10K 3/02* | (2006.01) | |
| *F02C 3/28* | (2006.01) | |
| *C01B 3/12* | (2006.01) | |
| *C10K 1/00* | (2006.01) | |

(52) U.S. Cl.
CPC ............... *C01B 3/52* (2013.01); *C10K 1/005* (2013.01); *C10K 3/026* (2013.01); *C10K 3/04* (2013.01); *F01K 17/04* (2013.01); *F01K 23/067* (2013.01); *F02C 3/28* (2013.01); *C01B 2203/0283* (2013.01); *C01B 2203/0415* (2013.01); *C01B 2203/0475* (2013.01); *C01B 2203/0485* (2013.01); *C10J 2300/093* (2013.01); *C10J 2300/1612* (2013.01); *C10J 2300/1653* (2013.01); *F05D 2220/722* (2013.01); *F05D 2260/61* (2013.01); *F05D 2260/611* (2013.01); *Y02C 10/04* (2013.01); *Y02E 20/16* (2013.01); *Y02E 20/18* (2013.01); *Y02E 20/185* (2013.01); *Y02P 20/146* (2015.11)

(56) References Cited

U.S. PATENT DOCUMENTS

| | | | |
|---|---|---|---|
| 7,980,083 B2 | 7/2011 | Yu | |
| 8,252,091 B2 | 8/2012 | Anand et al. | |
| 2007/0082306 A1* | 4/2007 | Drnevich | C10J 3/00 431/12 |
| 2007/0137107 A1* | 6/2007 | Barnicki | C01B 3/34 48/198.3 |
| 2007/0256361 A1* | 11/2007 | Kindig | C01B 3/105 48/197 R |
| 2008/0152966 A1 | 6/2008 | Lee et al. | |
| 2009/0061265 A1* | 3/2009 | Lee | C01B 3/384 429/412 |
| 2011/0314814 A1 | 12/2011 | Tsutsumi et al. | |

FOREIGN PATENT DOCUMENTS

| | | |
|---|---|---|
| GB | 811 749 A | 8/1956 |
| JP | 05-059964 A | 3/1993 |
| JP | 07-316568 A | 12/1995 |
| JP | 2000-178567 A | 6/2000 |
| JP | 2003-106514 A | 4/2003 |
| JP | 2004-161502 A | 6/2004 |
| JP | 2007-246372 A | 9/2007 |
| JP | 2009-221098 A | 10/2009 |
| JP | 2010-138042 A | 6/2010 |
| JP | 2010-144720 A | 7/2010 |
| JP | 2010-184994 A | 8/2010 |

* cited by examiner

CO2 SEPARATION AND RECOVERY EQUIPMENT, AND A COAL GASIFICATION COMBINED POWER PLANT COMPRISING CO2 SEPARATION AND RECOVERY EQUIPMENT

TECHNICAL FIELD

The present invention relates to CO2 separation and recovery equipment, and a coal gasification combined power plant including CO2 separation and recovery equipment.

BACKGROUND ART

Coal is stably low in value, large in amount of deposit that can be mined, small in uneven distribution among districts, and stable in properties of sources. For such reasons, it is expected that coal will be a main primary energy up to the future, and the use thereof will be enlarged the economic growth all over the world in the future.

In the enlargement of the use of coal, advanced nations of the EU countries, North America, Australia, and Japan have been setting an innovative mid-term and long-term CO2-reducing target for global warming. In order to enlarge the use of coal, which is larger in CO2 discharge per unit electric energy than other primary energies, it is indispensable to reduce amount of the CO2 discharge.

Thus, as a new technique capable of reducing the amount of the CO2 discharge, Patent Documents 1 and 2 disclose a coal-used technique having a plant structure in which a coal gasification combined power plant IGCC (integrated coal gasification combined cycle) is combined with CO2 separation and recovery equipment CCS (carbon dioxide capture and storage).

In this plant, steam is added to a coal gasified gas (CO rich gas) obtained by mixing coal and oxygen with each other and combusting the mixture in a coal gasifying furnace, thus converting CO to CO2 and H2. In addition, an absorption liquid which has absorbed CO2 is regenerated to separate and recover the CO2. The recovered CO2 is compressed to be liquefied, and the liquefied CO2 is transported and stored. Hydrogen-rich gas, which is obtained after the CO2 is recovered, is used as a gas turbine fuel. Accordingly, the plant can be made high in efficiency as a whole.

DOCUMENTS ON PRIOR ARTS

Patent Document

Patent Document 1: JP 2010-144720 A
Patent Document 2: JP 2009-221098 A

DISCLOSURE OF THE INVENTION

Problems to be Solved by the Invention

CO2 separation and recovery equipment CCS attached to a coal gasification combined power plant IGCC includes a CO shift reactor in the equipment. In the CO shift reactor, steam is added to CO to convert the CO to CO2 and H2. The CO2 which is obtained by the conversion in the CO shift reactor is compressed to be liquefied, and the liquefied CO2 is transported and stored.

CO shift reaction for converting the CO to the CO2 is an exothermic reaction. A catalyst used to promote the reaction rate thereof is generally hindered by heat. Thus, unless the catalyst tank temperature inside the reactor is satisfactorily controlled, the catalyst is lowered in power so that the CO2 conversion rate tends to be declined.

At present, the temperature control made against the catalyst power decline is a manual control and remains as a complicated temperature control made on the basis of plant operator's empirical assumptions and past plant data.

In the present invention, attention has been paid to a catalytic reaction in the CO shift reactor for separating CO2 from a coal gasified gas in this coal-used technique. The invention provides CO2 separation and recovery equipment which can obtain a higher CO2 recovery rate when the reaction is advanced under optimal conditions matching with the state of the load operation in the plant, and a coal gasification combined power plant including CO2 separation and recovery equipment with a high plant efficiency.

Means for Solving the Problem

CO2 separation and recovery equipment of the present invention includes a CO shift reactor into which a gas containing main components of CO2 and H2 is introduced to convert the gas into CO and H2O; an inlet valve provided on an inlet side of the CO shift reactor; an outlet valve provided on an outlet side of the CO shift reactor; a steam control valve that applies high-temperature steam to a foregoing part of the inlet valve; and a gas composition analyzer that senses a gas composition of a stream flowing into the CO shift reactor; wherein the steam control valve is controlled by a difference in molar amount of CO and H2O that is calculated from analysis results of the gas composition analyzer, and wherein the inlet valve and the outlet valve of the CO shift reactor are controlled on the basis of a catalyst tank temperature of the CO shift reactor.

Preferably, when energy determined on the basis of the catalyst tank temperature of the CO shift reactor is deviated from an upper limit energy or a lower limit energy, the inlet valve and the outlet valve of the CO shift reactor are controlled.

Preferably, the total amount of temperature energy necessary for a catalytic reaction in the CO shift reactor is calculated from the molar amount of CO that is calculated from the analysis results of the gas composition analyzer and temperature energy necessary for the catalytic reaction; when the energy determined on the basis of the catalyst tank temperature is lower than the total amount of the temperature energy necessary for the catalytic reaction, the inlet valve is controlled to be opened and simultaneously the outlet valve is controlled to be closed so that the inside of the CO shift reactor is in a pressurized state and the catalyst tank temperature is raised.

Preferably, when the energy determined on the basis of the catalyst tank temperature is higher than temperature energy for hindering the catalytic reaction, the inlet valve is controlled to be opened and simultaneously the outlet valve is controlled to be opened so that the inside of the reactor is in a depressurized state and the catalyst tank temperature is lowered.

Preferably, the total amount of temperature energy necessary for a catalytic reaction in the CO shift reactor is calculated from the molar amount of CO that is calculated from the analysis results of the gas composition analyzer and temperature energy necessary for the catalytic reaction; when the energy determined on the basis of the catalyst tank temperature is lower than the total amount of the temperature energy necessary for the catalytic reaction, the inlet valve is controlled to be opened and simultaneously the outlet valve is controlled to be closed so that the inside of the CO shift reactor is in a pressurized state and the catalyst tank temperature is raised; and when the energy determined on the basis of the catalyst tank temperature is higher than temperature energy for hindering the catalytic reaction, the inlet valve is controlled to be opened and simultaneously the outlet valve is controlled to be opened so that the inside of the reactor is in a depressurized state and the catalyst tank temperature is lowered.

A coal gasification combined power plant including $CO_2$ separation and recovery equipment of the present invention includes a combined cycle plant including a steam turbine and a gas turbine; a coal gasifying plant that gasifies pulverized coal and provides the gasified coal as a fuel gas to a combustor of the gas turbine of the combined cycle plant; and $CO_2$ separation and recovery equipment including a CO shift reactor into which a gas containing main components of $CO_2$ and $H_2$ discharged from the coal gasifying plant is introduced to convert the gas into CO and $H_2O$; wherein the $CO_2$ separation and recovery equipment further includes an inlet valve provided on the coal gasifying plant side of the CO shift reactor, an outlet valve provided on an outlet side of the CO shift reactor, an extraction control valve that applies steam extracted from the steam turbine to a foregoing part of the inlet valve, and a gas composition analyzer that senses a gas composition of a stream flowing into the CO shift reactor, wherein the extraction control valve is controlled by a difference in molar amount of CO and $H_2O$ that is calculated from analysis results of the gas composition analyzer, and wherein the inlet valve and the outlet valve of the CO shift reactor are controlled on the basis of a catalyst tank temperature of the CO shift reactor.

Preferably, when the analysis results of the gas composition analyzer shows that the gas composition is rich in CO and the plant has a margin of load, the extraction control valve is controlled to increase the steam extracted from the steam turbine.

Preferably, when the analysis results of the gas composition analyzer shows that the gas composition is rich in $H_2O$, the extraction control valve is controlled to decrease the steam extracted from the steam turbine.

Preferably, when the analysis results of the gas composition analyzer shows that the gas composition is rich in CO and the plant has no margin of load, the extraction control valve is controlled to decrease the steam extracted from the steam turbine.

Preferably, when energy determined on the basis of the catalyst tank temperature of the CO shift reactor is deviated from an upper limit energy or a lower limit energy, the inlet valve and the outlet valve of the CO shift reactor are controlled.

Preferably, the total amount of temperature energy necessary for a catalytic reaction in the CO shift reactor is calculated from the molar amount of CO that is calculated from the analysis results of the gas composition analyzer and temperature energy necessary for the catalytic reaction; and when the energy determined on the basis of the catalyst tank temperature is lower than the total amount of the temperature energy necessary for the catalytic reaction, the inlet valve is controlled to be opened and simultaneously the outlet valve is controlled to be closed so that the inside of the CO shift reactor is in a pressurized state and the catalyst tank temperature is raised.

Advantageous Effects of the Invention

According to the $CO_2$ separation and recovery equipment of the invention, even when the catalyst tank temperature in the CO shift reactor is deviated from the upper limit or lower limit thereof, the equipment can promptly restore to its former stable driving-state.

According to the coal gasification combined power plant including $CO_2$ separation and recovery equipment of the invention, the whole plant can be improved in efficiency in addition to the above-mentioned advantageous effect.

DESCRIPTION OF EMBODIMENTS

Hereinafter, embodiments of the invention will be described with reference to the drawings.

Embodiments

Figure 2:
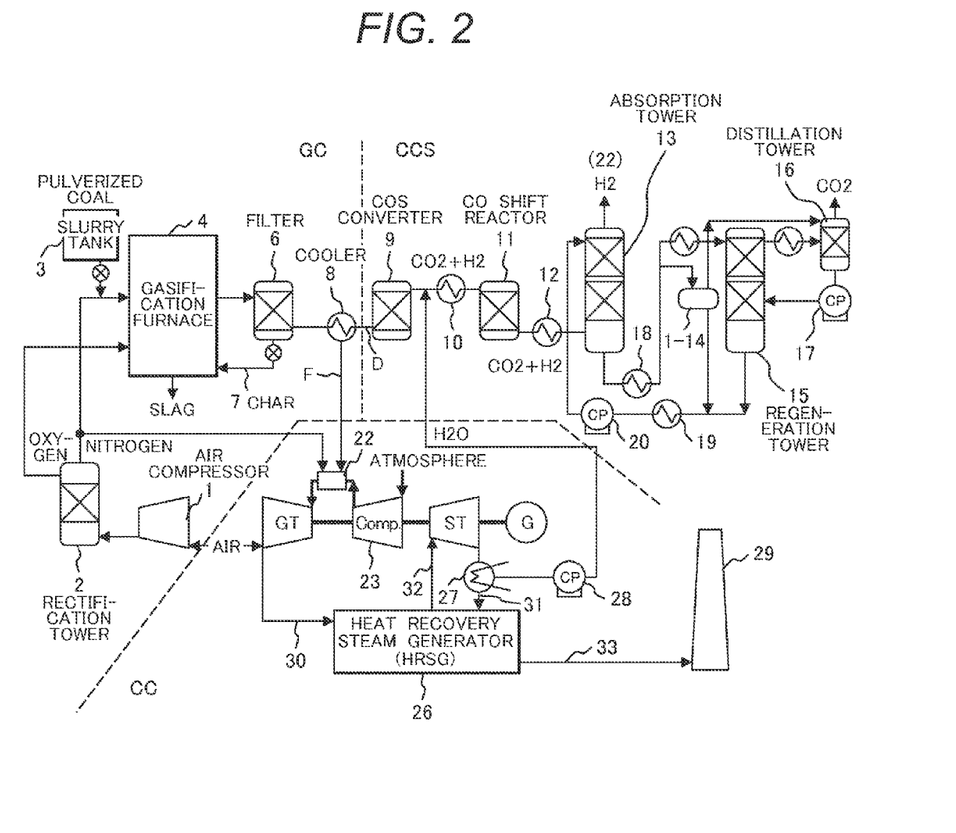
FIG. 2 is a view illustrating a structure of a coal gasification combined power plant including $CO_2$ separation and recovery equipment.

With reference to FIG. 2, a structure of a coal gasification combined power plant including $CO_2$ separation and recovery equipment is illustrated as an example of applying a CO shift reactor for converting CO to $CO_2$.

In the plant in FIG. 2, the following plants and equipment are combined with each other: a combined cycle plant CC including a steam turbine and a gas turbine, a coal gasifying plant GC that gasifies pulverized coal and provides the gasified coal as a fuel gas to a combustor of the gas turbine of the combined cycle plant CC; and $CO_2$ separation and recovery equipment CCS that separates and recovers CO, in the form of $CO_2$, discharged from the gasifying plant.

Usually, a coal gasification combined power plant denotes a plant section in which a combined cycle plant CC is combined with a coal gasifying plant GC. The whole of the equipment in FIG. 1 can be referred to as a coal gasification combined power plant including the $CO_2$ separation and recovery equipment CCS. A CO shift reactor for converting CO to $CO_2$ is a main constituting apparatus of the $CO_2$ separation and recovery equipment CCS. The following will describe, in turn, each of the plants and the equipment constituting the coal gasification combined power plant including the $CO_2$ separation and recovery equipment CCS.

With reference to FIG. 2, firstly, the combined cycle plant CC including the steam turbine and the gas turbine is described. In the illustrated combined cycle plant CC, a gas turbine GT, a steam turbine ST, a compressor 23 and a power generator G are located on a rotation axis. The gas turbine GT and the steam turbine ST is prime movers to drive the compressor 23 and the power generator G which are a load.

In the gas turbine GT, the atmosphere is introduced into the compressor 23 to gain compressed air; a combustor 22 combusts the compressed air and a fuel gas F from the coal gasifying plant GC, which will be detailed later; the gas turbine GT is rotated by the resultant combustion energy. Nitrogen, which is also supplied into the combustor 22 from the coal gasifying plant GC, is used to lower the combustion temperature in the combustor 22, thereby decreasing nitrogen oxide NOX generated by high-temperature combustion.

An exhaust gas 30 from the gas turbine GT that has worked in this way still has a sufficiently large thermal energy. Thus, the steam turbine ST further recovers the heat. Specifically, an exhaust heat recovery boiler 26 obtains a steam 32 by heat exchange between the gas turbine exhaust gas 30 and condensed water 31 from a condenser 27, and the steam turbine ST is driven by the steam 32. An exhaust gas 33 from which the heat has been recovered in the exhaust heat recovery boiler 26 is discharged through a chimney 29 to the atmosphere. The steam which has worked in the steam turbine ST is returned into water in the condenser 27 and then supplied into the exhaust heat recovery boiler 26 as condensed water. In this way, the steam is circulated to be used.

Secondly, the coal gasifying plant GC is described, which gasifies pulverized coal and provides the gasified coal as the fuel gas F to the gas turbine combustor 22 of the combined cycle plant CC. The coal gasifying plant GC, which mainly includes a gasifying furnace 4, combusts pulverized coal with high-concentration oxygen, thus finally yielding the fuel gas F.

The high-concentration oxygen used in the gasifying furnace 4 is obtained by further compressing the exhaust gas 30, which has been obtained from the gas turbine GT of the combined cycle plant CC described above and has a high temperature and a high pressure, with an air compressor 1 and by providing the compressed air which has passed through the air compressor 1 to a rectification tower 2 to separate the compressed air into oxygen and nitrogen. The oxygen obtained by the separation is sent to the gasifying furnace 4 as high-concentration oxygen, while the nitrogen is sent to the gasifying furnace 4 and the gas turbine combustor 22.

In the gasifying furnace 4, pulverized coal in a slurry tank 3 is mixed with the oxygen obtained by the separation in the rectification tower 2 and combusted. At this time, chemical reactions according to formulae (1) and (2) described below are caused to generate carbon monoxide CO and enthalpy H. A slag 5 generated by the combustion of the pulverized coal in the gasifying furnace 4 is separately discharged.

$$C + 1/2 O_2 \rightarrow 2CO + \Delta H(29.4 \text{ kJ/mol}) \quad (1)$$

$$C + H_2O \rightarrow CO + H_2 + \Delta H(-38.2 \text{ kJ/mol}) \quad (2)$$

Thereafter, the combusted gas is introduced into a filter 6 to be separated from an impurity char 7 and then, in a cooler 8, separated into the fuel gas F to be sent to the gas turbine 21 and a mixed gas D containing sulfur. The impurity char 7 is returned to the gasifying furnace 4.

The fuel gas F obtained in this way by the combustion of the pulverized coal in the gasifying furnace 4 is given to the combustor 22 of the gas turbine GT of the combined cycle plant CC described above so that the fuel gas F is effectively used as a fuel.

Meanwhile, the mixed gas D containing sulfur is also obtained by the combustion of the pulverized coal in the gasifying furnace 4. This mixed gas D is effectively used in the CO2 separation and recovery equipment CCS for separating and recovering CO discharged from the carbon gasifying plant GC into CO2. Finally, this matter of the mixed gas D is described below.

A main component of the mixed gas D containing sulfur is COS. In a COS converter 9, COS is first converted to H2S and is further separated into sulfur S and CO2+H2.

Meanwhile, the steam which has worked in the steam turbine ST and obtained from the condenser 27 is passed through a pump 28 and then mixed with an outlet stream from the COS converter 9. The mixture is heated by a heater 10 and then introduced into a CO shift reactor 11. At this time, the mixed gas (CO+H2+H2O) heated by the heater 10 causes a chemical reaction according to a formula (3) in the CO shift reactor 11.

$$CO + H_2O \rightarrow CO_2 + H_2 + H_2O + \Delta H(40.9 \text{ kJ/mol}) \quad (3)$$

Thereafter, CO2 is passed through an absorption tower 13, a regeneration tower 14, and a distillation tower 16 and recovered. The hydrogen H2 generated in the absorption tower 13 is sent into the combustor 22 of the gas turbine GT to be a fuel. The water H2O is recovered and reused, for example, in the steam turbine ST system.

The reaction according to the formula (3) generated in the CO shift reactor 11 in the CO2 separation and recovery equipment CCS is a CO shift reaction using a catalyst. The reaction is an exothermic reaction giving enthalpy ΔH (40.9 kJ/mol). Thus, the generated heat decreases the power of the catalyst. Accordingly, in order to effectively cause the CO shift reaction with high efficiency, it is indispensable to control the temperature.

The reaction decides the CO2 conversion rate, which affects the recovery rate of CO2 obtained through the distillation tower 16. The CO shift reaction is a one-to-one equimolar reaction between CO and H2O. The CO is produced from the gasifying furnace, while the H2O is extracted and produced from the steam turbine ST. Accordingly, temperature can be controlled to obtain a higher CO2 conversion rate and promote the progress of the reaction if the composition ratio of CO and H2O can be analyzed on line during the reaction.

In the invention, these various quantities generated in the CO shift reactor 11 are controlled or regulated as below.

Figure 1:
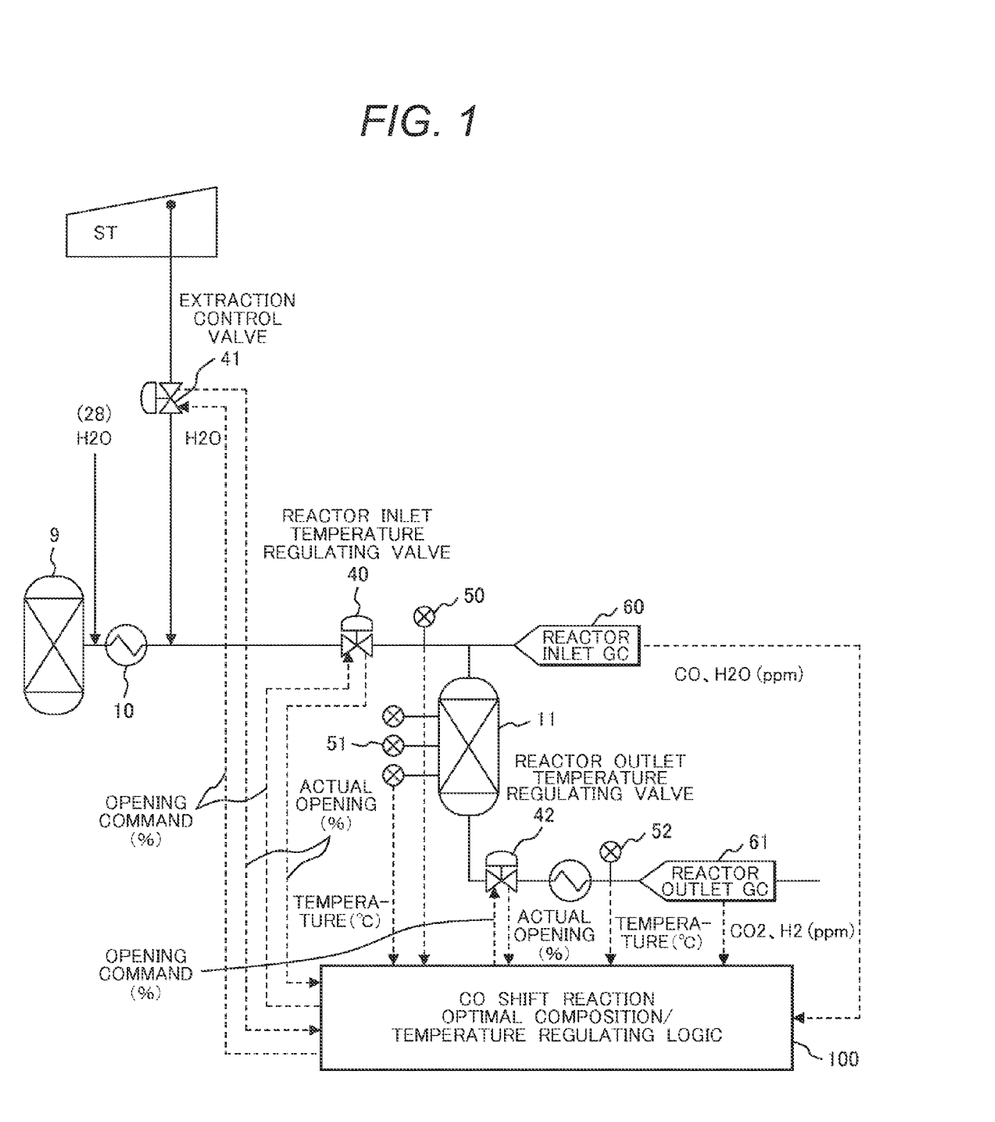
FIG. 1 is a view illustrating a pipe systematic diagram of the vicinity of a CO shift reactor 11.

FIG. 1 shows a pipe systematic diagram of the vicinity of the CO shift reactor 11. In this figure, the CO shift reactor 11 introduces CO2+H2 from the COS converter 9 through the heater 10 and a reactor inlet temperature regulating valve 40. Gas extracted from the steam turbine ST is introduced through an extraction control valve 41 into a foregoing part of the reactor inlet temperature regulating valve 34. Furthermore, condensed water steam is introduced from the pump 28 illustrated in FIG. 2 to a foregoing part of the heater 10. A reactor outlet temperature regulating valve 34 is located on the outlet side of the CO shift reactor 11.

The condensed water and the extracted gas, both of which contain H2O, are introduced into the reactor 11. These are used for respective purposes as follows. As described above, the condensed water steam from the pump 28 is mixed with the outlet stream from the COS converter 9 to be turned to a mixed gas (CO+H2+H2O) heated by the heater 10. As a result, the chemical reaction of the formula (3) is caused in the CO shift reactor 11.

Meanwhile, because the CO shift reaction is a one-to-one equimolar reaction between CO and H2O, the gas extracted from the steam turbine ST contributes to a sensitive temperature regulation based on the equimolar reaction. In other words, the condensed water steam from the pump 28 takes charge of basic and rough chemical reaction in the CO shift reactor 11, while the gas extracted from the steam turbine ST takes charge of sensitive temperature regulation based on the equimolar reaction.

In FIG. 1, the reference character 100 denotes a CO shift reaction controller, which regulates the reactor inlet temperature regulating valve 40, the extraction control valve 41, and the reactor outlet temperature regulating valve 42 located before and after pipes connected to the CO shift reactor as terminals to be controlled and operated. For the regulation, temperature detectors 50, 51 and 52 are installed before, inside and after the CO shift reactor 11, respectively, to detect the temperature of the stream at the reactor inlet, the temperature of the catalyst in the reactor, and the reactor outlet temperature, respectively. Furthermore, in the invention, gas composition analyzers (on-line gas chromatographs) 60 and 61 are installed before and after the reactor 11, respectively, to sense the composition of CO and H2O.

As described above, in the invention, the on-line gas chromatographs 60 and 61 are installed at the inlet and outlet of the CO shift reactor 11, respectively, thus constantly analyzing the gas composition in the formula (3) during the reaction. Moreover, the catalyst tank temperature is detected by the temperature detector 52, thus making it possible to monitor and control the temperature which is a factor for hindering the catalyst.

Figure 3:
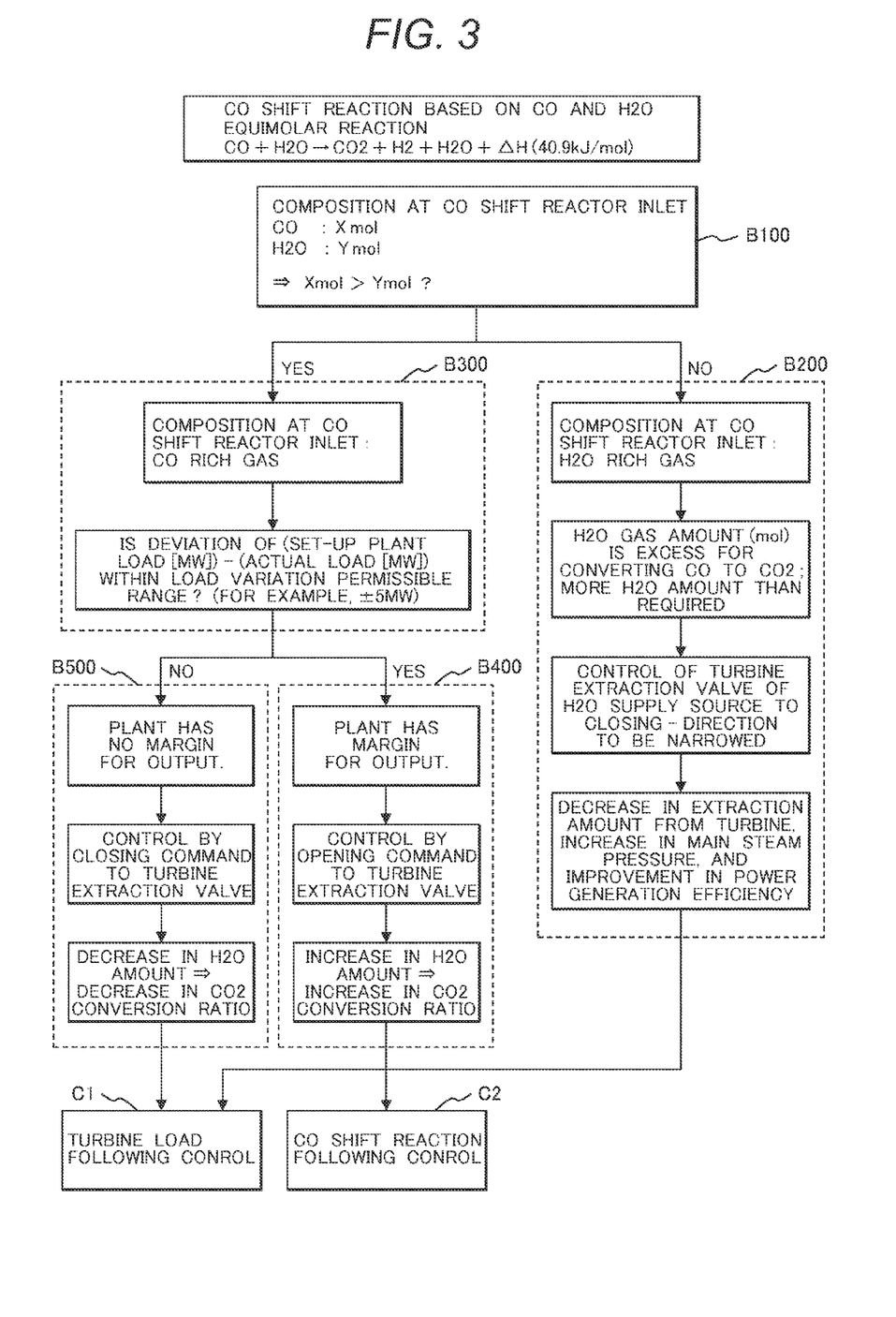
FIG. 3 is a chart showing a principle for deciding a controlling manner of a CO shift reactor control.

FIG. 3 shows a chart for deciding a controlling manner of a CO shift reactor to be realized on the basis of the analysis of the composition by the on-line gas chromatographs. Hereinafter, a description will be made about a principle for deciding what to do subsequently after synthetic judgment is made about the state of the inside of the CO shift reactor and the driving state of the coal gasification combined power plant.

The reaction (CO shift reaction) in the CO shift reactor 11 conducted according to the present invention is a one-to-one equimolar reaction between CO and H2O. Thus, in a box B100, the CO concentration (ppm) and the H2O concentration (ppm) are measured by the on-line gas chromatograph 60 at the reactor inlet to calculate the respective molar amounts. As a result thereof, it can be determined whether the inlet mixed gas composition in the CO shift reactor 11 is a CO rich gas or a H2O rich gas.

As a result thereof, when the inlet mixed gas composition in the CO shift reactor 11 is a H2O rich gas, a steam turbine load following control C1 should be finally conducted in accordance with determining steps shown in a box B200. The determining steps in the box B200 are that "when the gas is rich in H2O, the turbine extraction valve 41 is controlled to be closed so that the amount of the extracted steam from the turbine should be decreased since the amount of H2O gas for converting CO into CO2 is larger than required; at this time the amount of the extraction is decreased so that the main steam pressure is increased to improve the efficiency of power generation." This driving mode is the turbine load following control C1. When the gas is rich in H2O as described herein, the on-line gas chromatographs are used to analyze the gas composition, thereby making it possible to establish CO shift reaction conditions matching with the load operation in the plant.

In contrast, when the gas is rich in CO, an additional condition should be considered. In a box B300, a magnitude relationship of the actual load and the set-up load is considered as the additional condition. The determination in this box is as follows. "When the gas is rich in CO, a H2O gas molar amount matching with the CO molar amount is required since the CO shift reaction is an equimolar reaction; thus, a larger amount of the extracted gas should be introduced. However, H2O is supplied from the extraction valve of the turbine; therefore, the supply of H2O largely affects the load operation in the plant. Therefore, a subsequent management should be varied in accordance with whether or not the supply of H2O affects the load operation."

Specifically, the deviation of the actual load from the set-up load value is calculated and a margin value of an output of the plant is determined.

When the result of this determination shows that the deviation is within a load variation permissible range, a CO shift reaction following control C2 is selected and conducted according to a determination in a box B400. Steps of the determination in the box B400 are as follows. "When the gas is rich in CO and the plant has a margin value of the output, the H2O gas amount is insufficient; thus, the turbine extraction valve 41 may be controlled to be opened and to increase the steam extraction amount from the turbine. At this time, the CO2 conversion rate increases." This driving mode is the CO shift reaction following control C2.

When the result of this determination shows that the deviation exceeds the load variation permissible range, the steam turbine load following control C1 is selected and conducted according to a determination in a box B500. Steps of the determination in the box 500 are as follows. "When the gas is rich in CO and the plant has no margin value of the output, the H2O gas amount is insufficient but a shortage in the margin value of the steam turbine load is preferentially considered to control the turbine extraction valve 41 to be opened, thereby decreasing the steam extraction amount from the turbine. At this time, the CO2 conversion rate is decreased." This driving mode is the steam turbine load following control C1. In this case, the state of the CO rich gas is continued, which is not remedied and unavoidably kept as it is. When the plant has a margin value of the output, the state is newly remedied through the steps in the box B400.

In the invention, in accordance with the determination in FIG. 3, one of the steam turbine load following control C1 and the CO shift reaction following control C2 is selected to regulate the reactor inlet temperature regulating valve 40, the extraction control valve 41, and the reactor outlet temperature regulating value 42 which are the terminals to be controlled and operated.

Figure 4:
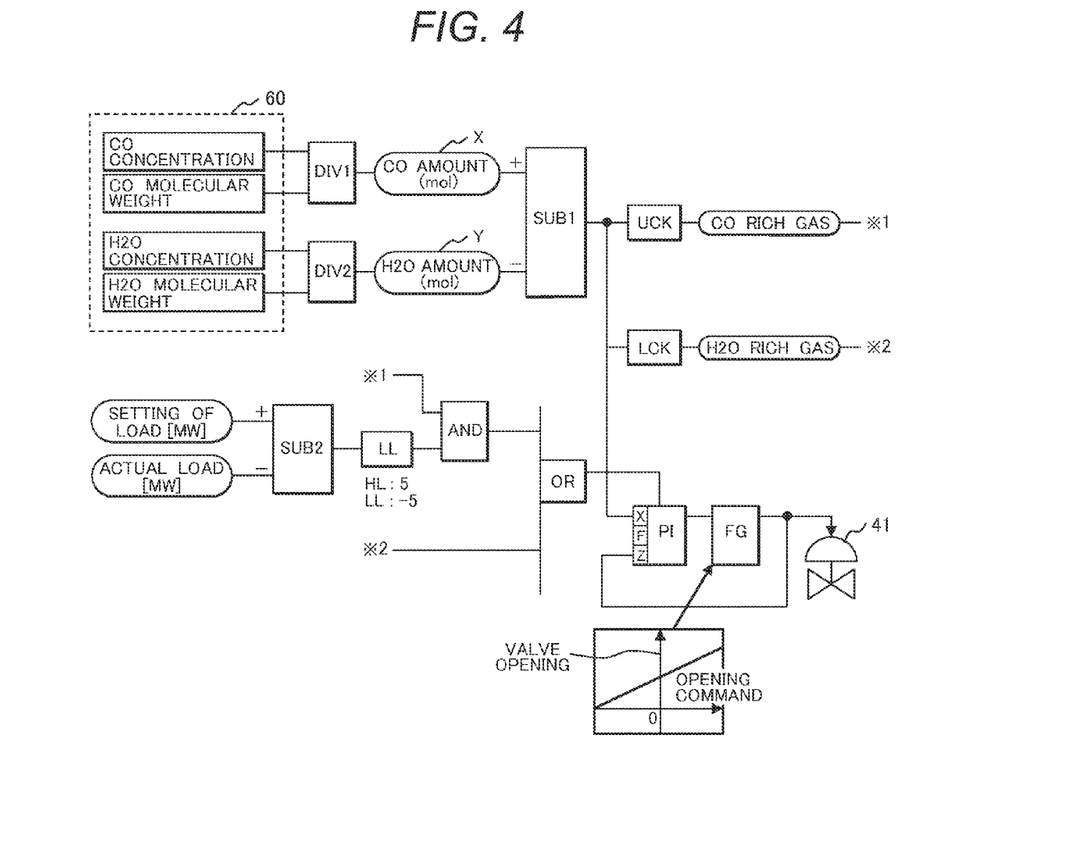
FIG. 4 is a view illustrating a turbine extraction valve control for controlling the amount of steam.

The following will describe a control of the extraction control valve 41, which is conducted from the above-mentioned viewpoint. FIG. 4 shows a view of a turbine extraction valve control for controlling the amount of steam to be added to the CO shift reaction. In FIG. 4, a DIV1 and a DIV2 are dividing circuits and calculate the CO molar amount X and the H2O molar amount Y, respectively, from outputs from the gas composition analyzer (on-line gas chromatograph) 60 located at a foregoing part of the reactor 11. A subtractor SUB 1 calculates a difference between the CO molar amount X and the H2O molar amount Y. Each of a CO richness deciding circuit UCK and a H2O richness deciding circuit LCK determines the gas state from the difference. When the gas is rich in CO, a signal is inputted to an AND circuit AND. When the gas is rich in H2O, a signal is inputted to an OR circuit OR.

An output from a load limiter LL is given to another input terminal of the AND circuit AND. As an input into the load limiter LL, a difference between the set-up load value and the actual load (divider SUB2) is given, and the difference is outputted when the plant has a margin degree.

An output from the AND circuit AND is issued when the gas is rich in CO and the plant has a margin degree and is inputted to an adjustor PI of the extraction control valve 41 through the OR circuit OR. The deviation signal of the subtractor SUB1 is inputted as a target value to an X terminal of the adjustor PI, and further an output from a function generator FG subsequent to the adjustor PI is fed back to a terminal Z thereof to control the opening of the extraction control valve 41. The function generator FG adjusts the opening of the extraction control valve 41 to be larger as the input into the function generator FG is larger.

Thus, as far as the plant has a margin degree, gas extracted from the turbine is supplied to remedy the CO rich state.

The operation of this is the CO shift reaction following control C2 based on the block B400 in FIG. 3.

This control is stopped when the plant has no margin degree or the CO rich state is remedied. When the plant has no margin degree, the AND circuit AND issues no output so that the adjustor PI closes the extraction control valve 41 regardless of any input into the adjustor PI. As a result, the supply of the extracted gas is stopped. This operation is the steam turbine load following control C1 based on the block B500 in FIG. 3. At this time, it is possible to conduct a control to restrict the amount of the extracted gas to a minimum level, continuing to control the extraction control valve 41 without closing the valve 41.

Lastly, when the gas is rich in H2O, a signal is inputted into the OR circuit OR so that the extraction control valve 41 is controlled by the adjustor PI. At this time, the polarity of the signal, which has been already given from the subtractor SUB1 to the input terminal X of the adjustor PI, is opposite to that when the gas is rich in CO. Therefore, the extraction control valve 41 is controlled to be narrowed (to reduce the extracted gas). The operation of this is the steam turbine load following control C1 based on the block B200 in FIG. 3.

The control of the extraction control valve 41 in each of the situations in FIG. 3 has been described above. As a result of the control, the flow rate flowing into the CO shift reactor 11 in FIG. 1 is largely varied, and further the temperature in the CO shift reactor 11 is also varied. Accordingly, with the control of the extraction control valve 41 in FIG. 4, the reactor inlet temperature regulating valve 40 and the outlet temperature regulating valve 42 are controlled from the viewpoint of temperature control.

First, a principle of the temperature control in this case is described. The CO shift reaction in the CO shift reactor 11 is an exothermic reaction. The resultant thermal energy brings a hindering factor for the catalyst. It is therefore necessary to keep the catalyst tank temperature optimal. In the invention, the temperature regulating valves 40 and 42, which are located at the inlet and the outlet of the CO shift reactor 11, respectively, are used to control the catalyst tank temperature to be kept optimal.

In order to optimize the catalyst tank temperature, the following temperature condition is considered:

$$\text{Temperature } A \text{ [kJ/mol]} \times \text{Reactant [mol]} < \text{Temperature } B \text{ [kJ]} < \text{Temperature } C \text{ [kJ]} \quad (4)$$

wherein Temperature A is lowest temperature energy [kJ/mol] necessary for the catalytic reaction, Temperature B is catalyst tank temperature energy [kJ], Temperature C is temperature energy [kJ] for hindering the catalytic reaction, and Reactant is the molar amount [mol] of CO or H2O.

The temperature A is a temperature energy which enables the catalytic reaction at a minimum level. This energy quantity depends on the reactant amount (the molar amount of CO and H2O in the formula (3)).

The temperature B is an actual measured temperature energy which is detected in the reactor 11, and is an absolute value thereof.

The temperature C is a temperature energy which hinders the catalytic reaction. A requirement for optimally advancing the CO shift reaction is that the temperature quantity of the temperature B in the formula (4) is always maintained.

Figure 5:
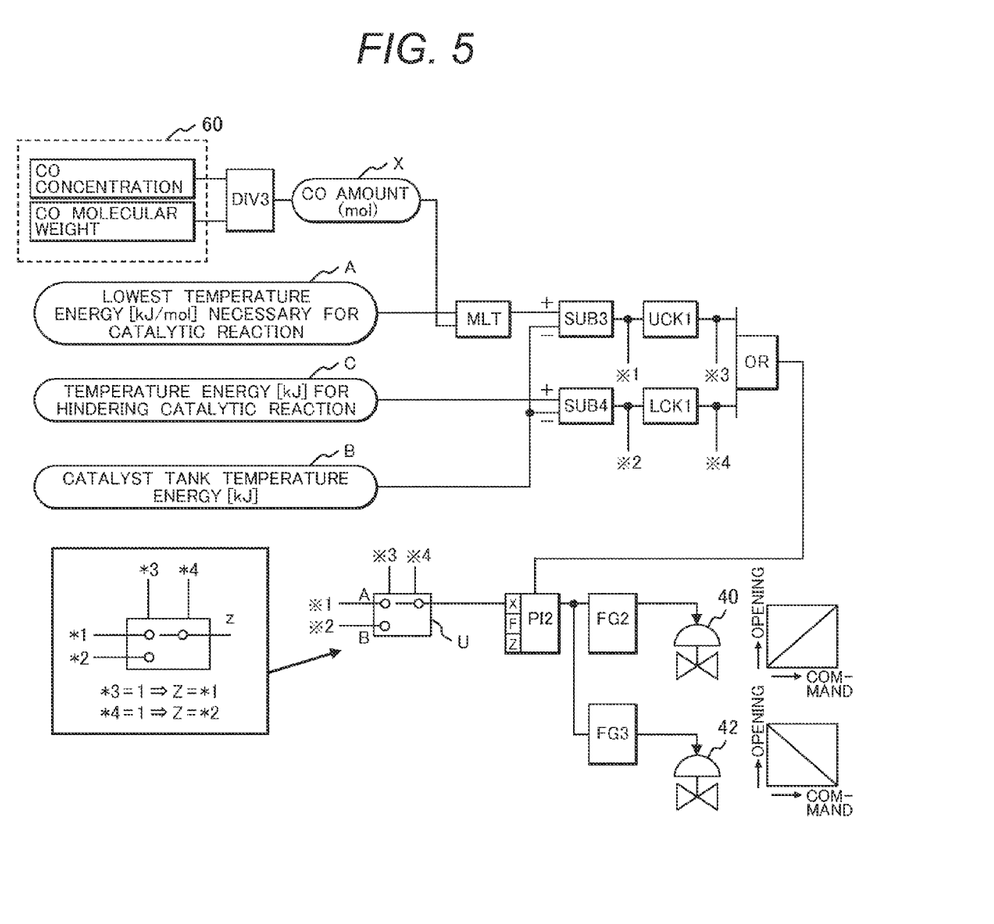
FIG. 5 is a view illustrating a control of temperature regulating valves located at an inlet and an outlet of the CO shift reactor.

In order to satisfy the above-mentioned relationship, the temperature regulating valves 40 and 42, which are located at the inlet and the outlet of the CO shift reactor 11, respectively, are controlled in accordance with a control logic in FIG. 5 in the invention. Out of the above-mentioned three temperatures A, B and C, the temperatures A and C are set up before the control. The temperature B is an actual measured value obtained from a temperature measuring instrument 51 installed in the catalyst tank.

First, in a divider DIV3, the CO molar amount X is calculated from an output from the gas chromatograph 60 located at the inlet of the reactor 11. In a multiplier MLT, the amount X is multiplied by the temperature A to obtain the total amount (kJ) of the lowest temperature energy necessary for the catalytic reaction, which is required for CO in the reactor 11.

A subtractor SUB3 calculates a difference between the total amount (kJ) of the lowest temperature energy necessary for the catalytic reaction, which is obtained from the multiplier MLT, and the catalyst tank temperature energy [kJ]. When an insufficiency decider UCK1 decides that an insufficiency is generated (the catalyst tank temperature energy [kJ] B is smaller than the total amount [kJ] of the lowest temperature energy necessary for the catalytic reaction), a subtractor SUB3 controls the temperature regulating valves 40 and 42 by an adjustor PI2 through the OR circuit OR.

Another requirement is needed for establishing the OR circuit OR. A subtractor SUB4 conducts a subtraction between the temperature energy C for hindering the catalytic reaction and the catalyst tank temperature energy B. When an excess decider LCK1 decides that an excess is generated (the catalyst tank temperature energy B is larger than the temperature energy C for hindering the catalytic reaction), the subtractor SUB4 controls the temperature regulating valves 40 and 42 by the adjustor PI2 through the OR circuit OR.

For the former requirement for establishing the OR circuit OR, the catalyst tank needs to be heated. For the latter requirement, the catalyst tank needs to be cooled.

Specifically, when a difference is generated between the lowest temperature energy [kJ/mol] necessary for the catalytic reaction and the catalyst tank temperature energy [kJ] so that the catalyst tank temperature is required to be raised, the inlet temperature regulating valve 40 is controlled to be opened and simultaneously the outlet temperature regulating valve 42 is controlled to be closed. In this way, the inside of the reactor is made into a pressurized state to raise the catalyst tank temperature.

When the catalyst tank temperature energy [kJ] is larger than the temperature energy [kJ] for hindering the catalytic reaction so that the catalyst tank temperature is required to be lowered, the inlet temperature regulating valve 40 is controlled to be opened and simultaneously the outlet temperature regulating valve 42 is controlled to be opened. In this way, the inside of the reactor is made into a depressurized state to lower the catalyst tank temperature. This controlling manner makes it possible to control the catalyst tank temperature to match with the composition of the gas remaining in the reactor.

A control quantity switcher U is a unit for, depending on the situation, switching the set-up value to be provided to the input terminal X of the adjustor PI2. When the OR circuit OR is established in the insufficiency decider UCK1, the switcher U provides an output from the subtractor SUB 3 as a set-up signal to the adjustor PI2. When the OR circuit OR is established in the excess decider LCK1, the switcher U provides an output from the subtractor SUB 4 as a set-up signal to the adjustor PI2. In this way, the inlet temperature regulating valve 40 and the outlet temperature regulating valve 42 are controlled.

The inlet temperature regulating valve 40 and the outlet temperature regulating valve 42 are driven by the single adjustor PI2. In some cases, these valves are controlled to be opened or closed in the same direction. In other cases, one of the valves is opened while the other is closed. This switching between the directions of the operation, which is not illustrated in FIG. 5, can easily be realized by setting up a polarity-inverting circuit for changing the opening and closing directions of the inlet temperature regulating valve 40 and the outlet temperature regulating valve 42 under consideration as to which of the insufficiency decider UCK1 and the excess decider LCK1 satisfies the operation-permissible requirement. Thus, a description about a specific manner for realizing the switching between the directions is omitted herein.

The optimal manner of controlling a CO shift reactor in CO2 separation and recovery equipment can be implemented by employing a turbine extraction valve control for controlling the amount of steam to be added to CO shift reaction in the CO2 separation and recovery equipment of the invention, and employing a CO shift reactor temperature control in the CO2 separation and recovery equipment.

INDUSTRIAL APPLICABILITY

The application of the invention is desired in a coal gasification combined power plant including CO2 separation and recovery equipment from the viewpoints of both of efficiency and environment.

EXPLANATION OF REFERENCE CHARACTERS

1: Air compressor, 2: Rectification tower, 3: Slurry tank, 4: Gasifying furnace, 5: Slag, 6: Filter, 7: Impurity char, 8: Cooler, 9: COS converter, 10: Heater, 11: CO shift reactor, 13: Absorption tower, 14: Regeneration tower, 16: Distillation tower, 22: Combustor, 23: Compressor, 29: Chimney, 30: Gas turbine exhaust gas, 26: Exhaust heat recovery boiler, 28: Pump, 27: Condenser, 31: Condensed water, 32: Steam, GT: Gas turbine, ST: Steam turbine, G: Power generator, F: Fuel gas, D: Mixed gas containing sulfur, DIV: Dividing circuit, 60 and 62: Gas composition analyzers (on-line gas chromatographs), SUB: Subtractor SUB, UCK: CO richness deciding circuit, LCK: H2O richness deciding circuit, AND: AND circuit, OR: OR circuit, LL: Load limiter, 41: Extraction control valve, PI: Adjustor, FG: Function generator, C2: CO shift reaction following control, C1: Steam turbine load following control.

What is claimed is:

1. $CO_2$ separation and recovery equipment comprising:
a CO shift reactor into which a gas containing main components of CO and $H_2O$ is introduced to convert the gas into $CO_2$ and $H_2$;
an inlet valve provided on an inlet side of the CO shift reactor;
an outlet valve provided on an outlet side of the CO shift reactor;
a steam control valve that applies high-temperature steam to a foregoing part of the inlet valve;
a gas composition analyzer that senses a gas composition of the gas flowing into the CO shift reactor; and
a shift reaction controller configured to control the inlet valve, the outlet valve, and the steam control valve,
wherein the shift reaction controller is programmed to control the steam control valve based on a difference in molar amount of CO and $H_2O$ that is calculated from analysis results of the gas composition analyzer,
wherein the shift reaction controller is programmed to control the inlet valve and the outlet valve of the CO shift reactor on the basis of a catalyst tank temperature of the CO shift reactor, including controlling the inlet valve and the outlet valve when energy determined on the basis of the catalyst tank temperature of the CO shift reactor is deviated from an upper limit energy or a lower limit energy,
wherein the shift reaction controller is programmed to calculate a total amount of temperature energy necessary for a catalytic reaction in the CO shift reactor from the molar amount of CO that is calculated from the analysis results of the gas composition analyzer and temperature energy necessary for the catalytic reaction, and
wherein the shift reaction controller is programmed to open the inlet valve to the CO shift reactor and simultaneously close the outlet valve when the energy determined on the basis of the catalyst tank temperature is lower than the total amount of the temperature energy necessary for the catalytic reaction, so that the CO shift reactor is in a pressurized state and the catalyst tank temperature is raised.

2. The $CO_2$ separation and recovery equipment according to claim 1, wherein the shift reaction controller is programmed to open the inlet valve and simultaneously open the outlet valve when the energy determined on the basis of the catalyst tank temperature is higher than temperature energy for hindering the catalytic reaction so that the CO shift reactor is in a depressurized state and the catalyst tank temperature is lowered.

3. A coal gasification combined power plant comprising $CO_2$ separation and recovery equipment, comprising:
a combined cycle plant including a steam turbine and a gas turbine;
a coal gasifying plant that gasifies pulverized coal and provides the gasified coal as a fuel gas to a combustor of the gas turbine of the combined cycle plant; and
$CO_2$ separation and recovery equipment including a CO shift reactor into which a gas containing main components of CO and $H_2O$ discharged from the coal gasifying plant is introduced to convert the gas into $CO_2$ and $H_2$;
wherein the $CO_2$ separation and recovery equipment further includes an inlet valve provided on the coal gasifying plant side of the CO shift reactor, an outlet valve provided on an outlet side of the CO shift reactor, an extraction control valve that applies steam extracted from the steam turbine to a foregoing part of the inlet valve, a gas composition analyzer that senses a gas composition of the gas flowing into the CO shift reactor, and a shift reaction controller configured to control the inlet valve, the outlet valve, and the extraction control valve,
wherein the shift reaction controller is programmed to control the extraction control valve based on a difference in molar amount of CO and $H_2O$ that is calculated from analysis results of the gas composition analyzer,
wherein the shift reaction controller is programmed to control the inlet valve and the outlet valve of the CO shift reactor on the basis of a catalyst tank temperature of the CO shift reactor, including controlling the inlet valve and the outlet valve when energy determined on the basis of the catalyst tank temperature of the CO shift reactor is deviated from an upper limit energy or a lower limit energy, wherein the shift reaction controller is programmed to calculate a total amount of temperature energy necessary for a catalytic reaction in the CO shift reactor from the molar amount of CO that is calculated from the analysis results of the gas composition analyzer and temperature energy necessary for the catalytic reaction, and wherein the shift reaction controller is programmed to open the inlet valve to the CO shift reactor and simultaneously close the outlet valve when the energy determined on the basis of the catalyst tank temperature is lower than the total amount of the temperature energy necessary for the catalytic reaction, so that the CO shift reactor is in a pressurized state and the catalyst tank temperature is raised.

4. The coal gasification combined power plant comprising $CO_2$ separation and recovery equipment according to claim 3, wherein the shift reaction controller is programmed to control the extraction control valve to increase the steam extracted from the steam turbine when the analysis results of the gas composition analyzer shows that the gas composition is rich in CO and the combined cycle plant has a margin of load.

5. The coal gasification combined power plant comprising $CO_2$ separation and recovery equipment according to claim 3, wherein the shift reaction controller is programmed to control the extraction control valve to decrease the steam extracted from the steam turbine when the analysis results of the gas composition analyzer shows that the gas composition is rich in $H_2O$.

6. The coal gasification combined power plant comprising $CO_2$ separation and recovery equipment according to claim 4, wherein the shift reaction controller is programmed to control the extraction control valve to decrease the steam extracted from the steam turbine when the analysis results of the gas composition analyzer shows that the gas composition is rich in CO and the combined cycle plant has no margin of load.

7. The coal gasification combined power plant comprising $CO_2$ separation and recovery equipment according to claim 4, wherein the shift reaction controller is programmed to open the inlet valve and simultaneously open the outlet valve when the energy determined on the basis of the catalyst tank temperature is higher than temperature energy for hindering the catalytic reaction so that the CO shift reactor is in a depressurized state and the catalyst tank temperature is lowered.

* * * * *